United States Patent [19]
Yata et al.

[11] 3,836,262
[45] Sept. 17, 1974

[54] INDICATOR CIRCUIT

[75] Inventors: Kotaro Yata; Motonobu Matsuda, both of Osaka, Japan

[73] Assignee: Minolta Camera Kabushiki Kaisha, Osaka, Japan

[22] Filed: June 29, 1972

[21] Appl. No.: 267,615

[30] Foreign Application Priority Data
July 7, 1971 Japan.............................. 46-49608
July 7, 1971 Japan.............................. 46-49609

[52] U.S. Cl............................... 356/226, 356/227
[51] Int. Cl............................... G01j 1/44
[58] Field of Search............ 356/223, 226, 227; 95/10 CE; 307/226, 311

[56] References Cited
UNITED STATES PATENTS

| | | | |
|---|---|---|---|
| 3,188,520 | 6/1965 | La Beaume...................... | 307/226 |
| 3,528,749 | 9/1970 | Bowker.......................... | 356/223 |
| 3,562,654 | 2/1971 | Conant, Sr...................... | 307/226 |
| 3,594,088 | 7/1971 | Akiyama et al.................. | 356/226 |
| 3,603,799 | 9/1971 | Nobusawa.................. | 95/10 CE UX |
| 3,651,744 | 3/1972 | Okada............................ | 356/226 |
| 3,677,151 | 7/1972 | Werner et al.................. | 95/10 CE |
| 3,678,821 | 7/1972 | Kitai.............................. | 95/10 CE |
| 3,710,115 | 1/1973 | Jubb.............................. | 356/226 |

OTHER PUBLICATIONS
D. Heiserman, Light Emitting Diodes, Electronics World, Jan. 1968, pp. 36, 37, 66, 67.

*Primary Examiner*—Ronald L. Wibert
*Assistant Examiner*—F. L. Evans
*Attorney, Agent, or Firm*—Staas, Halsey & Gable

[57] ABSTRACT

Apparatus is disclosed for measuring and providing an indication of illumination, comprising a delay circuit including a light-receiving element and a capacitor, for integrating the quantity of light in accordance with illumination incident on the light-receiving surface of the light-receiving element; a switching circuit actuated by an output signal from the delay circuit; a pulse generator circuit generating pulses of a constant frequency; and a counter circuit comprising a plurality of binary counter circuits disposed in cascade connection, in which the counter circuit is provided with counting elements corresponding to all digits and indicating luminescent diodes connected to output terminals of the counting elements. The counter circuit initiates the counting of the pulses derived from the pulse generator circuit in accordance with illumination incident on the light-receiving surface of the light-receiving element, and the delaying operation of the delay circuit. The counting circuit counts the number of the pulses in a period of time until the switching circuit is actuated, thereby providing a digital indication of a set analog value.

13 Claims, 11 Drawing Figures

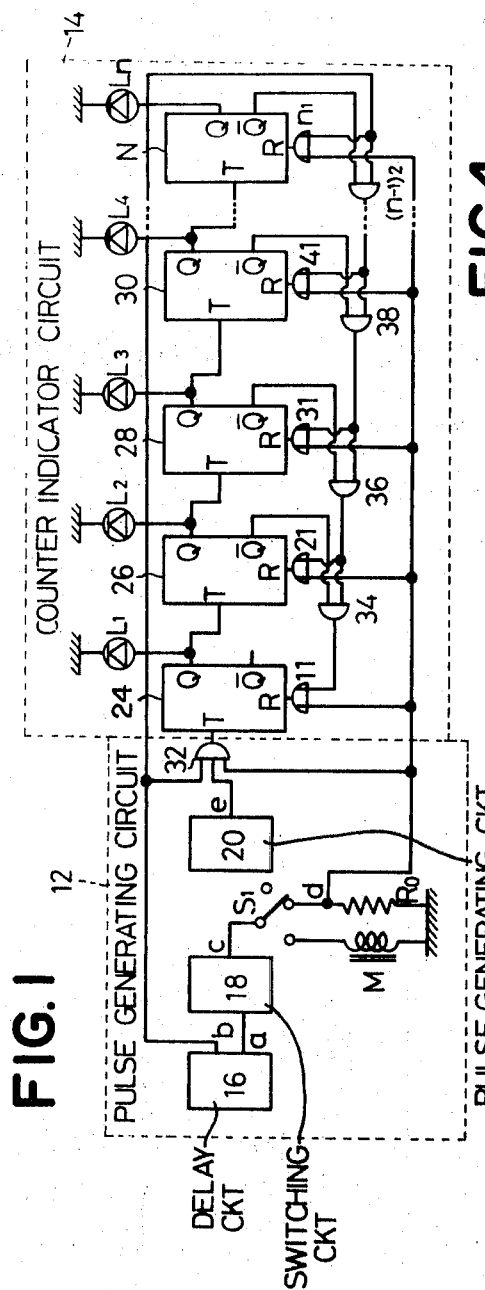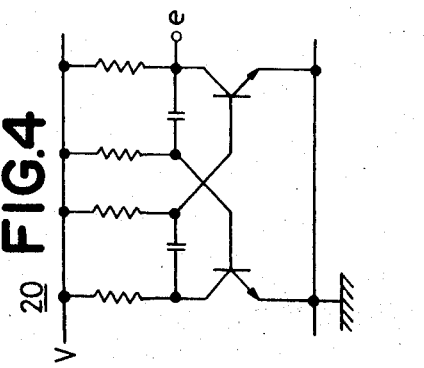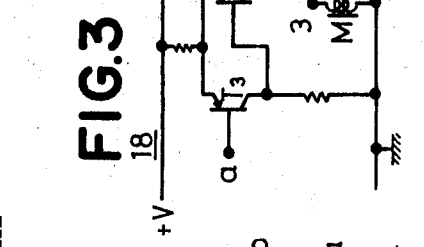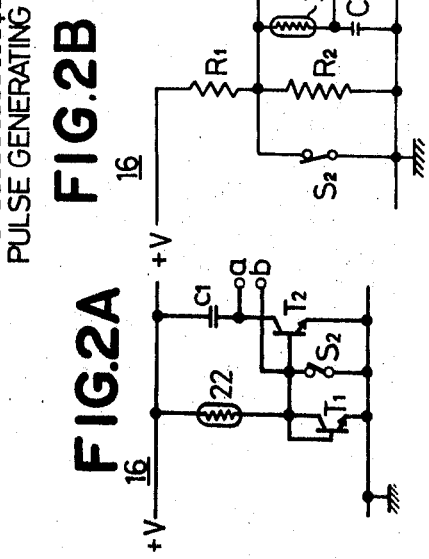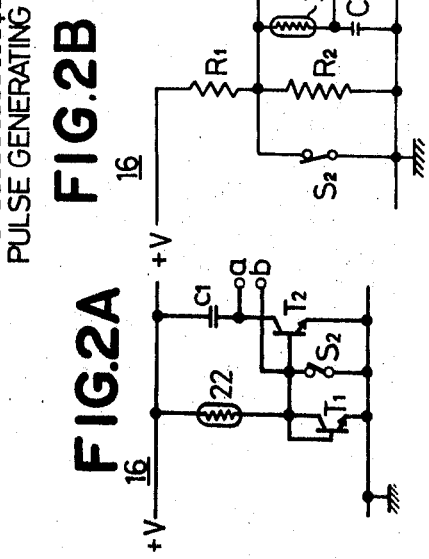

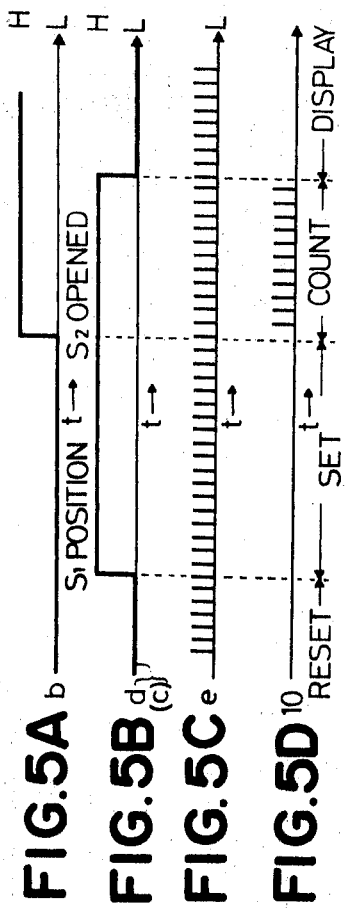
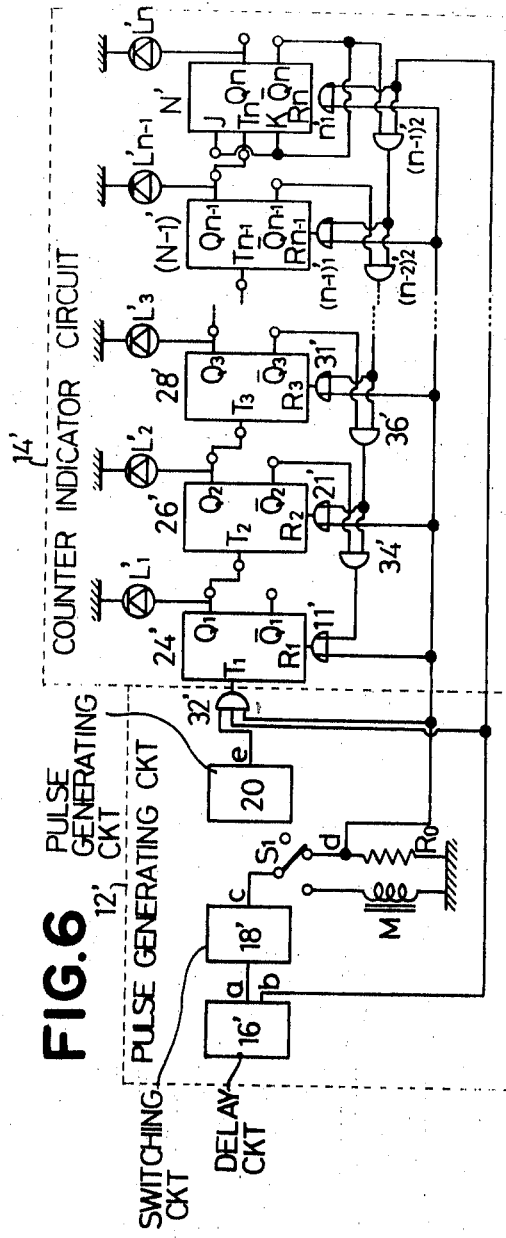

PATENTED SEP 17 1974

INDICATOR CIRCUIT

BACKGROUND OF THE INVENTION

1. Field of the Invention

This invention relates to indicator circuits, and more particularly to indicator circuits which convert an analog value into the number of pulses and indicate this number in the form of binary digital values.

2. Description of the Prior Art

In the prior art, a binary counter circuit is employed for converting an analog value into a binary digital value and the circuit is adapted to indicate the converted digital value with an output from a counting element of each digit. However, the conventional circuit of this type is complicated in construction and incurs the possibility of misreading or misinterpretation of the indication. Accordingly, it is desirable to indicate the analog value with one counting element indicating the corresponding digital value, to construct the indicator circuit to be easy to fabricate as an integrated circuit and to eliminate the possibility of misreading or misinterpretation of the indication.

SUMMARY OF THE INVENTION

An object of this invention is to provide an indicator circuit which employs a binary counter circuit for converting an analog value into a binary digital value and in which the digital value corresponding to the analog value is indicated with an output from one counting element of each digit.

Another object of this invention is to provide an indicator circuit in which pulses generated at a constant frequency are counted within a period of time dependent upon external light.

Still another object of this invention is to provide an indicator circuit with a warning circuit, for providing a warning indication of excess or inadequate subject illumination.

BRIEF DESCRIPTION OF THE DRAWINGS

While the specification concludes with claims particularly pointing out and distinctly claiming the subject matter which is regarded as the invention, preferred embodiments are disclosed in the following detailed description taken in conjunction with the accompanying drawings, in which:

FIG. 1 is a block diagram showing one example of this invention;

FIGS. 2A and 2B are illustrative embodiments of a delay circuit, and FIGS. 3 and 4 illustrate a switching circuit and a pulse generator circuit, respectively, included in a broken-line block 12 in FIG. 1;

FIGS. 5A, B, C and D show time charts, for explaining the circuit exemplified in FIG. 1; and FIGS. 6 and 7 are block diagrams illustrating alternative embodiments of this invention.

DESCRIPTION OF THE PREFERRED EMBODIMENTS

In FIG. 1, there is illustrated one embodiment of the present invention. A block 12, indicated by a broken line, is a circuit which generates a pulse in accordance with an analog value to be counted and a block 14 similarly indicated by a broken line, is an indicator circuit which counts the pulse and indicates it in the form of a binary digital value.

FIGS. 2A, 2B, 3 and 4 show, respectively, delay circuits 16 and 16', a switching circuit 18 and a pulse generator circuit 20, making up the block 12. FIGS. 1 to 4 illustrate one example of this invention as being applied to a camera.

The exposure value of a camera is dependent upon conditions for photographing such as the shutter speed, the aperture of the diaphragm (aperture value), sensitivity of a film used and intensity of illumination derived from the object to be photographed. A description will be given in connection with one illustrative example of this invention in which the shutter speed is indicated in accordance with brightness of the object to be photographed on the assumption that the aperture of the diaphragm is preferentially set and that film sensitivity is constant.

In FIGS. 1 and 2A, reference numeral 16 indicates a delay circuit, in which a series circuit, including a capacitor $C_1$ for integration of the quantity of incident light and a transistor $T_2$ is connected in parallel with a series circuit comprising a photoconductive element 22 as of cadmium sulfide serving as a light-receiving element, whose resistance depends upon incident illumination, and a transistor $T_1$. The collector of the transistor $T_1$ is connected to the base of the transistor $T_2$.

The transistor $T_1$ produces a logarithmically compressed output voltage in accordance with illumination on a light-receiving surface of the photoconductive element 22. The transistor $T_2$ produces, in turn, a logarithmically expanded current based upon the logarithmically compressed output, by which the capacitor $C_1$ is charged. Reference character $S_2$ designates a switch, which is normally closed and is opened when a change-over switch $S_1$ in FIGS. 1 and 3 is connected to the side of a resistor $R_0$ and a magnet M is excited. FIG. 2B shows another example of the delay circuit, in which parts corresponding to those in FIG. 2A are indicated by like reference numerals and characters. In the figure, reference characters $R_1$ and $R_2$ designate resistors which form a voltage divider. The illustrated circuit also constitutes a delay circuit which integrates the quantity of light in accordance with illumination incident on the light-receiving surface of the light-receiving element. The switching circuit 18 shown in FIG. 1 is formed of, for example, a known Schmidt circuit such as depicted in FIG. 3, whose operation is reversed when an output signal from the delay circuit 16 exceeds a selected level. In FIG. 3, reference characters $T_3$ and $T_4$ designate transistors. The output from the delay circuit 16 is applied to the base of the transistor $T_3$ and an output from its collector is fed to the base of the transistor $T_4$.

The collector of the transistor $T_4$ is connected to a terminal $d$ through a movable contact of a three-position change-over switch $S_1$. In the switching circuit 18, when the switch $S_2$ of the delay circuit 16 is opened to start charging of the capacitor $C_1$, the transistor $T_4$ conducts and when the capacitor $C_1$ has been charged up to a predetermined voltage, the transistor $T_4$ is reversed to its OFF state.

The aforementioned change-over switch $S_1$ is normally connected with an open terminal, i.e. position 1, and at the time shutter speed indication is set, switch $S_1$ is connected in position 2 with the terminal of the resistor $R_0$, and at the time of photographing it is connected in position 3 with the magnet M for shutter driving. The clock pulse generator circuit 20 in FIG. 1 is, for example, an astable multivibrator such as shown in FIG. 4, which produces pulses occurring at a constant frequency.

In FIG. 1, reference characters 24, 26, 28, 30. . . . N indicate T-type flip-flop circuits interconnected in a cascade connection, each of which has an input terminal T, output terminals Q and $\bar{Q}$ and a reset terminal R in addition to two power source terminals. These flip-flop circuits, per se, are of a variety well-known in the art. The output terminal Q of the flip-flop circuit 24 is connected to the input terminal T of the subsequent flip-flop circuit 26; in turn, the output terminal Q of the flip-flop circuit 26 is connected to the input terminal T of the flip-flop circuit 28, and the subsequent circuits are similarly interconnected. The relationship between the output terminals Q and $\bar{Q}$ is such that when an output signal from the terminal Q is a high level (hereinafter referred to as a level H), terminal $\bar{Q}$ is at a low level (hereinafter referred to as a level L) and that when the terminal Q is at the level L, the terminal $\bar{Q}$ is at the level H. When the reset terminal R is at the level L, the output at the terminal Q is at the level L irrespective of the input signal to the input terminal T.

Reference numerals 11, 21, 31, 41, . . . n1 indicate OR circuits, and 32 and 34, 36, 38, . . . (n−1)2 indicate AND circuits and reference characters $L_1$, $L_2$, $L_3$, $L_4$, . . . $L_n$ represent indicator elements formed illustratively of luminescent diodes. The indicator elements $L_1$ to $L_n$ are connected to the output terminal Q of the flip-flop circuits 24 to N, respectively, and the flip-flop circuits 24 to N, the OR circuits 11 to n1, the AND circuits 32 and 34 to (n−1)2, and the indicator elements $L_1$ to $L_n$ make up the counter-indicator circuit 14.

The following will describe the operation of the indicator circuit 14 of this invention constructed as above described. The switch $S_2$ of the delay circuit 16 is normally closed and an output at its point b is of the level L as depicted in FIG. 5A and the change-over switch $S_1$ is disposed in position 1, so that an output at its point d is also at the level L as shown in FIG. 5B and is applied to the reset terminals R through the OR circuits 11 to n1, respectively. Therefore, the flip-flop circuits 24 to N are naturally held in their reset state.

Before photographing, when the change-over switch $S_1$ is disposed in position 2, connected to the resistor $R_0$ for shutter speed indication, the level of the output at the point d rises from the level L to that of H and the output at the point d is impressed through the OR circuits 11 to n1 to the reset terminals R of the flip-flop circuits 24 to N to set them. Under such conditions, when the switch $S_2$ is opened for measuring the shutter speed, the level of the output at the point b rises up to the level H as depicted in FIG. 5A and is supplied to the gates of the AND circuits 32 and 34 to (n−1)2. The input to the AND circuit 32 is already supplied with the output at the point d, so that only when supplied with the output from the pulse generator circuit 20 producing a clock signal or a series of pulses of a constant frequency, that is, when supplied with the outputs of amplitude H at the points b, d and e to satisfy the AND conditions, the AND circuit 32 is enabled and produces an output such as shown in FIG. 5D, which is fed to the input terminal T of the flip-flop circuit 24. The pulse generator circuit 20 is previously set so that the output pulse therefrom may be a negative pulse of 1 msec.

Simultaneously with opening of the switch $S_2$ for initiation of measurement of the shutter speed, the flip-flop circuits 24 to N are supplied with the pulse signal, by which the flip-flop circuits are sequentially actuated from the first stage one in a known binary manner to count the number of pulses impressed to the counter circuit 14. The number of pulses to be counted varies with the brightness of the object to be photographed measured by the delay circuit 16 and the switching circuit 18. When the counting operation is initiated based upon the binary system and the number of pulses counted reaches a certain value, the switch $S_2$ for measuring the shutter speed is opened to start charging of the capacitor $C_1$, for example, at the time of actuation of the flip-flop circuit 30 and when the capacitor $C_1$ has been charged up to a predetermined voltage the transistor $T_4$ of the switching circuit 18 is rendered nonconductive and the output at the point d is altered from the level H to that of L, as shown in FIG. 5B. As a result, the AND conditions of the AND circuit 32 are overturned and the AND circuit 32 is disabled to cut off the series of pulses fed to the input terminal T of the flip-flop circuit 24. The AND circuits 32 to (n−1)2 are held in the ON the one point state by the signals at the terminals $\bar{Q}$ of the flip-flop circuits corresponding thereto and outputs from the AND circuits of the subsequent stages (only the AND circuit (n−1)2 of the final stage being made conductive by the output of the delay circuit 16), respectively, from the time when the output is derived at the output terminal b from the delay circuit 16. As above described, the flip-flop circuits 24 to N are sequentially actuated by the output from the enabled AND circuit 32 and in accordance with the operation of the flip-flop circuits, for example at the same time as derivation of the output from the output terminal Q of the flip-flop circuit 28, the output at the terminal $\bar{Q}$ of the flip-flop circuit 28 lowers to the level L to cut off the gate signal of the OR circuit 21 through the AND circuit 22 of the preceding stage. Accordingly, as above described, when the output at the poind d lowers to the level L at the time of actuation of the flip-flop circuit 30, the flip-flop circuits 24, 26, and 28 are reset through their reset terminals R and the flip-flop circuits subsequent to that (30)+1 are not supplied with input signals respectively, so that they do not operate. Thus, only the output at the terminal Q of the flip-flop circuit 30 at the time of reversal of the output at the terminal b thereof rises up to the level H to energize the luminescent diode $L_4$. Namely, when the signal at the point d at the time of completion of measurement of the shutter speed changes from the level H to that of L, only one luminescent diode is lighted to provide a digital indication. Of course, the position of the digital indication changes every moment in response to the intensity of the illumination of the object to be photographed.

The exposure value of the camera becomes doubled every time it is raised one place. Accordingly, if a negative pulse of 1 msec. is used as the input as in the foregoing example of the present invention, when only the output at the terminal Q of the flip-flop circuit 24 of the first stage is disposed at the level H to energize the luminescent diode $L_1$, a shutter speed of 1/1,000 sec. is indicated and when the output at the terminal Q of the flip-flop circuit 26 is disposed at the level H to energize the luminescent diode $L_2$, a shutter speed of 1/500 sec. is indicated, and lighting of the luminescent diode $L_3$ indicates a shutter speed of 1/250 sec.

The luminescent diode used as the indicator elements in the present invention are highly excellent in luminous efficiency as compared with lamps heretofore employed. The indication in the camera is provided at a dark place in a finder, and accordingly the lighting current for the luminescent diode is sufficient to be about 100 to 500 μA, so that the luminescent diode is suitable for use with the parallel circuit of the flip-flop circuits as in the present invention.

In the example of FIG. 1, when the number of output pulses from the AND circuit 32 is great and the counting proceeded to the flip-flop circuit N of the nth digit and still continues, the counting returns to the flip-flop circuit $F_1$ of the first stage. FIG. 6 illustrates a modified form of this invention which is designed so that, when the shutter speed is low, an alarm is actuated to warm the operator of this condition.

FIG. 6 illustrates a circuit which is exactly the same as that of FIG. 1 except in that the final-stage flip-flop circuit N' of the counter circuit 14' is a J-K flip-flop circuit. In FIG. 6, the AND circuit 32' is such that when the switch $S_2$ is opened to provide an output at the terminal $b$ and the transistor $T_4$ is in the ON state to produce an output signal at the terminal $d$, a pulse signal is transmitted to the input terminal $T_1$ of the first-stage flip-flop circuit 24' and that in the absence of the output signal at the terminal $b$ or $d$, the pulse signal at the terminal $e$ is cut off. Accordingly, the AND circuit 32' supplies the terminal $T_1$ with pulses which are produced for an interval of time beginning with the opening of the switch $S_2$ to initiate counting, and terminating with the time of making the transistor $T_4$ conductive to terminate counting.

The block 14' in FIG. 6 is a binary counter and indicator circuit, in which counting elements of respective digits of the binary system are T-type flip-flop circuits 24', 26', 28', ... (N-1)' connected in cascade and a J-K flip-flop circuit N' supplied with an output from the flip-flop circuit (N-1)'. The luminescent diodes $L_1'$ to $L_{n-1}'$ are connected to the output terminals $Q_1$ to $Q_{n-1}$ of the flip-flop circuits 24' to (N-1)' and to the input terminals $T_2$ to $T_{n-1}$ of subsequent digits. A luminescent diode $L'_n$ is also connected to the one output terminal $Q_n$ of the final-stage J-K flip-flop circuit N'. The input terminal $T_1$ of the flip-flop circuit 24' of the first-stage digit is connected to the pulse generator circuit 20' through the AND circuit 32'.

The other output terminal $\bar{Q}_n$ of the final-stage flip-flop circuit N' and the aforementioned terminal $b$ are connected to the AND circuit (n−1)'2 and its output terminal and the other output terminal $\bar{Q}_{n-1}$ of the flip-flop circuit (N−1)' of the preceding stage are connected to the AND circuit (n−2)'2 and the other flip-flop circuits are similarly interconnected. The other output terminal $\bar{Q}_2$ of the flip-flop circuit 26' of the second digit and the output terminal of the AND circuit 36' of the immediately upper digit are connected to the AND circuit 34'.

Further, the output signal at the aforesaid terminal $d$ and that at the terminal $b$ are supplied through the two-input OR circuit n'1 to the reset terminal $R_n$ of the final-stage flip-flop circuit N' and the reset terminal $R_{n-1}$ of the flip-flop circuit (N−1)' is supplied with the output from the AND circuit (n−1)'2 and the output terminal at the terminal $d$ through the two-input OR circuit (n−1)'1. The reset terminals of the following flip-flop circuits are similarly connected. The reset terminal $R_2$ of the flip-flop circuit 26' of the second digit is supplied with the output from the AND circuit 36' and the output signal at the terminal $d$ through the OR circuit 21'. The reset terminal $R_1$ of the flip-flop circuit 24' of the first digit is supplied with the output from the AND circuit 34' and the output signal at the terminal $d$ through the OR circuit 11'. Since the final stage flip-flop circuit N' is a J-K flip-flop circuit, its output terminal $\bar{Q}_n$ is connected to its input terminals J and K.

A description will be given in connection with the operation of the binary counter and indicator circuit constructed as above described with regard to FIG. 6. Under normal conditions in which the output signals at the terminals $b$ and $d$ are both at the level L, the output from the OR circuit n'1 has the level L to reset the final stage flip-flop circuit N'. Further, since the outputs from the AND circuits (n−1)'2, (n−2)'2, ... 36' and 24' are all of the level L, the outputs from the OR circuits (n−1)'1, (n−2)'1 ... 31', 21' and 11' are at the level L to reset all of the flip-flop circuits 24' to N'.

At first, the switch $S_1$ is closed to bring the output at the terminal $d$ down to the level H to produce outputs in the OR circuits 11', 21', 31', ... n'1, setting all the flip-flop circuits 24' to N'. Under such set conditions, the series of negative pulses (N−L−H) are supplied to the input terminals $T_1$ to $T_n$ of the flip-flop circuits 24' to N' so that the outputs at their output terminals $Q_1$ to $Q_n$ and $\bar{Q}_1$ to $\bar{Q}_n$ are made reversible.

Then, the switch $S_2$ is opened by the counting start operation, to initiate charging of the capacitor $C_1$ for integrating quantity of light. The output level at the terminal $b$ rises up to the level H from that of L and consequently the output levels at the terminals $b$ and $d$ connected to the AND circuit 32' rise to the level H, so that every time the pulse signal is derived at the terminal $e$ of the pulse generator circuit $P_G$, the pulse signal is applied to the AND circuit 32'. This pulse is impressed upon the input terminal $T_1$ of the first stage flip-flop circuit 24' and the counter circuit 14' starts a known binary counting.

When the binary counting has proceeded to the mth flip-flop circuit M ($1 \leq m \leq N'$) as a result of impression of several pulses to the input terminal $T_1$, the charging voltage of the capacitor $C_1$ of the delay circuit 16' reaches a predetermined value and the transistor $T_4$ of the switching circuit 18' is reversed to return the output level at the terminal $d$ from the level H to that of L. As a result of this, the AND circuit 32' is disabled, and the subsequent pulses are not supplied to the terminal $T_1$ and the counter circuit 14' stops counting. At this time, the flip-flop circuit M is in its reversed condition and the output levels at the terminals $Q_m$ and $\bar{Q}_m$ are H and L respectively. The flip-flop circuits M + 1 to N' of more significant digits have not been reversed and the output levels at their output terminals $Q_m$ to $Q_n$ and $\bar{Q}_m$ to $\bar{Q}_n$ remain L and H respectively.

While, the output levels at the output terminals $Q_{m-1}$ to $Q_1$ of the flip-flop circuits M−1 to 24' of less significant digits than that of the flip-flop circuit M are in various states in accordance with the number of pulses derived at the terminal $e$, that is, the number of pulses fed to the terminal $T_1$ and these output levels are indefinite.

Further, the outputs at the output terminals $\bar{Q}_{m+1}$ to $\bar{Q}_n$ of the flip-flop circuits M+1 to N' of the more significant digits than that of the flip-flop circuit M remain at the level H because no pulse has been applied to the input terminals $T_{m+1}$ to $T_n$ of the flip-flop circuits M+1 to N' as previously described. Accordingly, at first, the output from the AND circuit (n−1)′2 is of the level H and that from the AND circuit m2 is also of the level H. On the other hand, since the flip-flop circuit M has already been reversed, the output from the AND circuit (m−1)2 is at the level L and those from the AND circuits (m−2)2 to 34′ are similarly at the level L.

Therefore, as the output level at the terminal $d$ changes from H to L, the inputs to the OR circuits (m−1)1 to 11′ of less significant digits than that of the flip-flop circuit M both become of the level L, so that their outputs also become of the level L. All of the flip-flop circuits M to 24′ whose reset terminals $R_{m-1}$ to $R_1$ are supplied with these outputs are thereby reset and the output levels at their output terminals $Q_{m-1}$ to $Q_1$ become L together with that at the terminal $d$, i.e. the output at terminal $d$ is disposed from H to L.

As a result of this, only the output at the output terminal $Q_m$ of the flip-flop circuit M is disposed at the level H and only the luminescent diode $L_m$ connected to the output terminal $Q_m$ is energized to indicate a shutter speed corresponding to illumination on the light-receiving surface of the photoconductive element 22.

For example, assuming that the pulse generator circuit 20′ provides a clock signal through the enabled AND circuit 32′, of one negative output pulse per 1/1,000 sec., the flip-flop circuit 24 is reversed with one pulse and the luminescent diode $L'_1$ is energized to indicate 1/1,000 sec. and the flip-flop circuit 26′ is reversed with two and three pulses and the luminescent diode $L'_2$ is energized to indicate 1/500. Further, the luminescent diode $L'_3$ is energized with four to seven pulses to indicate 1/250 sec. and the luminescent diode $L'_4$ is lighted with eight to fifteen pulses to indicate 1/125 sec. Thus, the embodiment of FIG. 6 is of particular utility when employed for indicating values of multiple series such as the shutter speed.

The final-stage flip-flop circuit is the J-K flip-flop circuit N′ and its input terminals J and K are both connected to the output terminal $\bar{Q}_n$, so that the inputs to the input terminals J and K are at the level H at the time of initiation of the counting. When one negative pulse is applied to the input terminal $T_n$, the flip-flop circuit N′ is reversed and the output of the output terminal $\bar{Q}_n$ and therefore the inputs to the input terminals J and K are disposed at the level L. Thereafter, the flip-flop circuit N′ remains unchanged irrespective of the number of pulses fed to the input terminal $T_n$, holding the output at the output terminal $Q_n$ at the level H and the luminescent diode $L'_n$ in its lighted condition at all times. Namely, the luminescent diode $L'_n$ gives a warning that the shutter speed is low, thus indicating impossibility of photographing without the use of an auxiliary light source.

Figure 7:
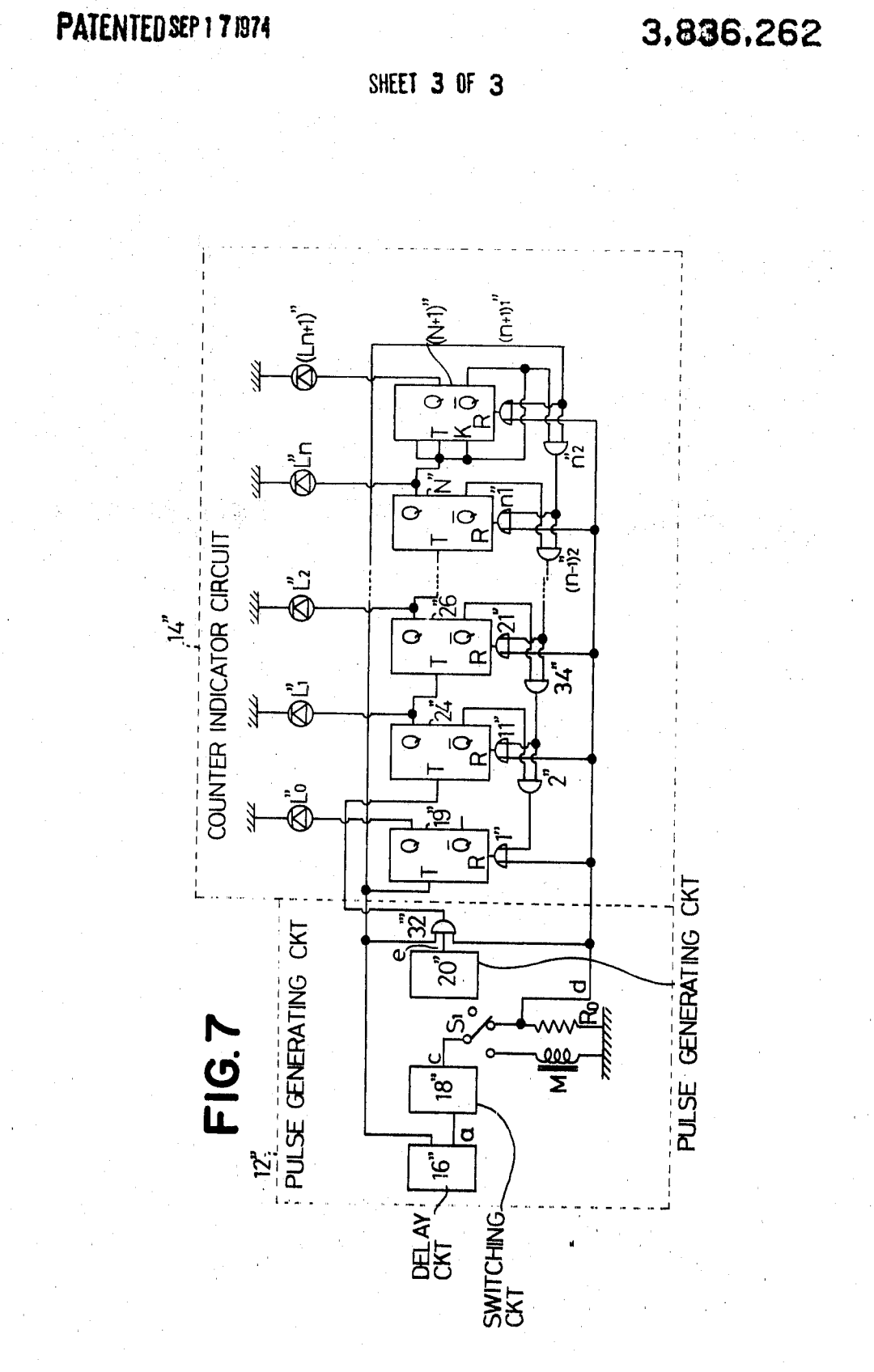

FIG. 7 illustrates another alternative form of this invention. In FIG. 7, reference character 19″ designates a warning circuit for high shutter speed which is connected in front of the first stage of the counter circuit 14″ and is formed with a T-type flip-flop circuit. In order that the flip-flop circuit 19″ may be reversed with a positive pulse, its input terminal T is connected to the output terminal $b$ and its reset terminal R is connected to an OR circuit 1″ which is supplied with the output at the output terminal $d$ and that from an AND circuit 2″. An indicator element $L''_0$ is a high speed warning device which is connected to an output terminal Q of the flip-flop circuit 19″. The flip-flop circuit (N+1)″ is a low shutter speed warning circuit which is connected to the final stage of the counter circuit 14″ and is formed with a J-K flip-flop circuit. The input terminal T of the flip-flop circuit (N+1)″ is connected to the output terminal Q of the flip-flop circuit N″ and its input terminals J and K are connected together to its output terminal $\bar{Q}$. Further, the reset terminal R of flip-flop circuit N″ is connected to an OR circuit (n+1)1″ which is connected to the terminals $b$ and $d$. Reference character $(L_{n+1})''$ designates a low speed warning indicating element connected to the output terminal Q.

With such an arrangement, when the switch $S_2$ is opened for starting measurement of the shutter speed, the output at the point b rises from the level L up to that of H and this signal is impressed to the input terminal T of the flip-flop circuit 19″ to reverse the outputs at its output terminals Q and $\bar{Q}$ and, as a result, the output level at its terminal Q becomes H. Accordingly, even if the object to be photographed is too bright, no output is produced at the point $d$ and even if no negative pulse is impressed to the input terminal T of the flip-flop circuit 24″ through the enabled AND circuit 32″, only the flip-flop circuit 19″ is reversed with the output at the point $b$ to energize only the luminescent diode $L''_0$, thus giving a warning that the required shutter speed is too high and that the object illuminating light is too intense. If the negative pulse is applied to the input terminal T of the flip-flop circuit 24″ after reversal of the flip-flop circuit 19″, the flip-flop circuit 24″ is reversed and the reset terminal R of the flip-flop circuit 19″ is supplied with the reset signal through the AND gate 2″ and the OR circuit 1″, so that, at the time of completion of measurement, the luminescent diode $L''_0$ is not lighted but only a luminescent diode of the position corresponding to the brightness of the object to be photographed is energized.

Then, when the object to be photographed is too dark and the counter circuit 14″ is supplied with pulses the number of which is beyond the capacity of the counter circuit, a signal is impressed from the output terminal Q of the flip-flop circuit N″ to the input terminal T of the flip-flop circuit (N+1)″. When the inputs to the input terminals J and K are both at the level H, the flip-flop circuit N+1 is reversed each time one negative pulse is impressed to its input terminal T as is the case with the T-type flip-flop circuit but when the inputs to the input terminals J and K are at the level L, the output from the flip-flop circuit (N+1)″ is not reversed irrespective of the number of pulses fed to the input terminal T and the inputs to the input terminals J and K are held at the level L. Namely, the flip-flop circuit (N+1)″ is reversed with a first pulse and the outputs at the output terminals Q and $\bar{Q}$ are altered to the levels H and L respectively and thereafter the inputs to the input terminals J and K are maintained at the level L, so that, at the time of completion of shutter speed measurement, the respective flip-flop circuits preceding flip-flop circuit (N+1)″ are reset through the AND circuit n2″, and consequently only the luminescent diode $(L_{n+1})''$ for low shutter speed alarm is lighted to provide a warning.

In the foregoing, the warnings of the upper and lower limits that the object to be photographed is too bright or too dark have been described as alarms for the shutter speed but it is needless to say that warnings of the upper and lower limits of exposure value and aperture value can be obtained with similar concepts and in a similar manner.

The warning circuit 19″, which is reversed with a positive pulse and formed with one flip-flop circuit can be readily obtained with the combined use of two flip-flop circuits.

As has been described in the foregoing, the pulse generating circuit 12 of the present invention comprises the delay circuit 16 including the light-receiving element and the capacitor for integrating a quantity of light; the switching circuit 18 for reversing its operation (or state) in accordance with the output signal from the delay circuit 16, the pulse generator circuit 20 for generating the clock pulses. The counter circuit 14 is provided for counting the number of pulses within the shutter speed or exposure interval being measured and is adapted for digital indication of the value of multiple series such as shutter speed, exposure value, aperture value or the like. Consequently, the present invention gives a warning of too high and low shutter speed easily and noticeably, which has been difficult to obtain and interpret in a conventional meter. Further, since the binary output is indicated as it is in digital form, the circuit therefor is simple in construction and inexpensive as compared with a matrix circuit heretofore employed in the prior art electric shutter of this type.

The indicator circuit of the present invention has the foregoing construction and operation and is capable of indicating an analog value in binary digital form and this indication is achieved with only one indicator element, so that there is no possibility of misinterpretation or misreading of the indication and power consumption for the indication can be minimized. Further, the circuit can be fabricated as an integrated circuit.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense. Although the foregoing examples employ the AND circuit and the OR circuit, it is also possible to obtain similar results by using a NAND circuit and a NOR circuit in place of them. Since reconstruction of the above circuit for incorporating the NAND and NOR circuits therein is apparent to those skilled in the art, no description will be given.

We claim:
1. Apparatus for measuring and providing an indication of the intensity of scene illumination having:
   a. light measuring means including a light-receiving element and a capacitor, for integrating the incident scene illumination and for providing a signal in accordance with the illumination incident upon said light-receiving element;
   b. switching means responsive to the signal derived from said light measuring means, for providing an output signal when the aforementioned signal exceeds a predetermined level;
   c. pulse generator means for providing a series of pulses at a selected frequency; and
   d. counter means comprising a plurality of counter elements disposed in cascade connection with each other, said counter means responsive to the initiation of light measuring by said light measuring means for initiating the counting of pulses derived from said pulse generator means and to the output signal derived from said switching means for terminating the counting of the pulses derived from said pulse generator means to provide thereby a digital indication of the intensity of incident illumination in accordance with the number of counted pulses, characterized in that each of said counter elements is coupled to energize selectively a radiation emitting device, each of said counter elements further comprising first and second output and reset terminals, said radiation emitting devices connected to the first output terminals of their corresponding counter element, said second terminals of said counter elements being connected to the reset terminal of the preceding counter element, and a plurality of discriminating circuits, each interconnected between the second output terminal of one of said counter elements and said reset terminal of the preceding counting element, and each of said discriminating circuits further connected to said switching means, whereby the Nth counter element which is most significant for the indication of the number of pulses counted by said counter means is actuated to energize said radiation emitting device coupled thereto.

2. Apparatus as claimed in claim 1, wherein said radiation emitting devices comprise luminescent diodes.

3. Apparatus as claimed in claim 1, wherein said counter elements comprise a flip-flop circuits.

4. Apparatus as claimed in claim 1, wherein said counter means includes warning means connected to the last counter element of said plurality of cascade-connected counter elements, a radiation emitting device coupled for energization to said warning means, said counter means having a selected capacity such that when the counted number of pulses exceeds the selected capacity, said warning means is actuated to energize said radiation emitting device to provide an indication that the incident scene illumination is below a predetermined limit.

5. Apparatus as claimed in claim 4, wherein said counter means includes first detecting means responsive to the final pulse derived from said pulse generator means, for comparing the states of the output of said counter elements with the state of said final counter element to determine those counter elements different from the state of said final counter element, and second detecting means for detecting which of said counter elements having a different state represents the most significant digit and for actuating said detected counter element to energize its coupled radiation emitting device to provide an indication of the most significant digit.

6. Apparatus as claimed in claim 5, wherein said counter means includes an actuatable second warning means, a radiation emitting device coupled for energization to said second warning means, and logic circuit means responsive to the initiating of light measuring by said light measuring means to be disposed in a first state for actuating said second warning circuit, and responsive to the counting of each of said counter elements to be disposed in a second state wherein said warning circuit is deactivated, said switching means coupled to each counter element to prevent said counter elements from disposing said logic circuit means in its second state when the intensity of scene illumination is too high, so that said second warning circuit is actuated to energize its radiation emitting device to provide an indication that the scene illumination is above a predetermined level.

7. Apparatus as claimed in claim 5, wherein there is included first logic means responsive to the final clock pulse counted by said counter means for determining which counter element has an output different from that of the final counter element and for resetting the immediately-preceding counter element, and second logic means responsive to when the output state of the final counter element is reversed for resetting the immediately-preceding counter element to thereby actuate the counter element whose output state is reversed by the final input pulse to energize its radiation emitting device.

8. Apparatus as claimed in claim 4, wherein said counter elements comprise flip-flop circuits connected in cascade with each other; an AND circuit coupled to said pulse generator means and responsive to a first signal derived from said light measuring means indicative of the operation of said light measuring means and responsive to a second signal derived from said switching means indicative that said switching means is in its ON state, to enable the passage of the pulses derived from said pulse generator means to the first flip-flop circuit of said counter means; each of said plurality of said flip-flop circuits having an output terminal coupled to said immediately-preceding flip-flop circuit; a first plurality of OR circuits, the output of each connected to the reset terminal of a corresponding flip-flop circuit, one input terminal of each of said OR circuits being connected to said switching means and responsive to the second signal to reset said flip-flops; a plurality of AND circuits, the output of each connected to another input terminal of one of said plurality of OR circuits, one input terminal of each of said AND circuits being coupled to an output terminal of said flip-flop circuits, and another input terminal of each of said AND circuits being connected to the output of the next AND circuit, said AND circuit coupled to the output terminal of the last flip-flop circuit having its other input terminal connected to the first signal whereby said flip-flop circuits of less significant digits than said flip-flop circuit of the most significant digit to which the binary counting has proceeded in accordance with the number of pulses, are each reset by the first and second signals.

9. Apparatus as claimed in claim 1, wherein said light measuring means is a delay circuit which comprises a parallel connection of a series circuit including a light-receiving element and a transistor with another series circuit including a capacitor for integrating the quantity of light and a transistor and which integrates the quantity of light in accordance with illumination incident on the light-receiving surface of the light-receiving element.

10. Apparatus as claimed in claim 1, wherein said light measuring means is a delay circuit which comprises a parallel connection of a series circuit including a light-receiving element and a capacitor for integrating the quantity of light with a voltage divider formed with a resistance element and which integrates the quantity of light in accordance with illumination incident on the light-receiving surface of the light-receiving element.

11. Apparatus for measuring and providing an indication of incident scene illumination, said apparatus comprising:
   a. light measuring means responsive to the incident scene illumination for providing an output signal therefrom indicative of the intensity of the incident scene illumination;
   b. actuatable means for initiating the operation of said light measuring means;
   c. switching means responsive to an output signal derived from said light measuring means, for providing an output signal when the aforementioned signal exceeds a predetermined level;
   d. pulse generating means for providing a series of pulses of a selected frequency; and
   e. counter means comprising a plurality of counter elements disposed in cascade connection with each other, said counter means responsive to the actuation of said initiating means for initiating the counting of the number of the pulses derived from said pulse generating means and to the output signal derived from said switching means to terminate the counting of the pulses, said counter means including visual indicating means responsive to the number of counted pulses to provide a visual indication of the intensity of the incident scene illumination, characterized by said visual indicating means which includes a plurality of radiation emitting elements, said counter means energizing only one of said radiation emitting elements dependent upon the intensity of the incident scene illumination, whereby the Nth counter element which is most significant for the indication of the number of pulses counted by said counter means is actuated to energize said radiation emitting element connected thereto.

12. Apparatus as claimed in claim 11, wherein said counter means includes warning means responsive to the counting of a predetermined number of pulses for providing an indication that the intensity of the scene illumination is below a predetermined level.

13. Apparatus as claimed in claim 11, wherein said counter means includes warning means coupled to said initiating means and said switching means for providing a warning indication if the interval between the initiation and termination of the light measuring process is less than a selected period, that the incident scene illumination is above a predetermined level.

* * * * *